United States Patent [19]

Rattee et al.

[11] 4,315,790

[45] Feb. 16, 1982

[54] DECORATION OF FLEXIBLE SUBSTRATES

[75] Inventors: Ian D. Rattee, Leeds; Edward J. Lewis, Hipperholme, Nr. Halifax, both of England

[73] Assignee: Decor Innovations Limited, London, England

[21] Appl. No.: 128,086

[22] Filed: Mar. 7, 1980

[30] Foreign Application Priority Data

Mar. 7, 1979 [GB] United Kingdom ............... 08103/79

[51] Int. Cl.[3] .......................... B32B 3/18; B41M 3/12; B44C 1/16

[52] U.S. Cl. .................................... 156/230; 156/234; 156/240; 156/249; 156/277; 427/148; 428/200; 428/207; 428/211; 428/511; 428/514; 428/913; 428/914

[58] Field of Search ............... 156/234, 240, 230, 249, 156/277; 427/148; 428/200, 913, 914, 207, 211, 511, 514, 537

[56] References Cited

U.S. PATENT DOCUMENTS 3,920,499 11/1975 Day et al. ........................... 156/240

FOREIGN PATENT DOCUMENTS 2645640 8/1977 Fed. Rep. of Germany .
2732576 2/1978 Fed. Rep. of Germany .
928347 6/1963 United Kingdom .
1092497 11/1967 United Kingdom .
1215941 12/1970 United Kingdom .
1287452 8/1972 United Kingdom .
1460742 1/1977 United Kingdom .
1496891 1/1978 United Kingdom .
1496892 1/1978 United Kingdom .

*Primary Examiner*—Bruce H. Hess
*Attorney, Agent, or Firm*—Leydig, Voit, Osann, Mayer & Holt, Ltd.

[57] ABSTRACT

Material for decorating textile fabrics under the action of heat and pressure comprises a flexible substrate having thereon a transferable layer which comprises a dye or pigment, a film-forming polymer, a crosslinking agent capable on curing of rendering the film-forming polymer insoluble and a thermally activatable catalyst for promoting the crosslinking reaction, the catalyst comprising the salt of one or more strong acid groups with an organic base and a salt of one or more weak acid groups with an organic base.

10 Claims, No Drawings

DECORATION OF FLEXIBLE SUBSTRATES

This invention relates to the decoration of flexible substrates, particularly textile fabrics, by the transfer method.

For simplicity hereinafter reference is made throughout to the treatment of textile fabrics. However it is to be understood that the term is to be construed widely to include any flexible substrate which needs to be decorated like a textile.

Various methods are known which comprise applying treatment compounds together with acid catalysts to textile fabrics and then heating the applied mixture in contact with the textile material to activate the acid catalyst and promote the treatment reaction. One such method for example is described in U.K. Patent Specification No. 1,092,497 according to which hexahydropyrimidone derivatives are applied to cellulose material as finishing agents; the derivatives being cured on the material by heating in the presence of an acid or potentially acid catalyst.

More particularly various methods are known whereby there is transferred to textile fabric polymeric material, a cross-linking agent for the polymeric material and an acid catalyst for promoting the cross-linking reaction. Such methods are described in for example U.K. Patent Specification Nos. 928,347, 1,215,941 and 1,287,452.

U.K. Patent Specification Nos. 1,496,891 and 1,496,892 describe the decoration of textile material using a decoration material comprising a flexible substrate having a removable layer thereon, the removable layer containing a dyestuff and/or pigment and being based on a polymeric material capable of adhering to a material to be decorated more strongly under the action of heat and pressure than the layer adheres to the flexible substrate which polymeric material is one which either decomposes substantially without residue on heating or which on heating forms a discontinuous deposit on the material to be decorated, and the removable layer containing, in addition to the dye or pigment, one or more agents serving to fix the dye or pigment in the material to be decorated. In use the decoration material is pressed on to the textile material to be decorated while heating, the flexible substrate is removed leaving the layer adhered to the textile fabric and the textile fabric is subjected to a heat treatment to fix the dyestuff and/or pigment on the fabric. Suitably in the decoration material, the removable layer contains an agent capable of crosslinking the polymeric material and an acid or acid-generating catalyst for promoting the crosslinking reaction.

German Offenlegungsschrift No. 26 45 640 describes the use of decoration material comprising a flexible substrate having a removable layer comprising a base of thermoplastic film-forming polymeric material, a pigment, a crosslinking agent capable of crosslinking the thermoplastic polymer, a thermally activated catalyst promoting the cross-linking reaction and a high temperature plasticiser.

It will be appreciated however that even when the acid catalyst used is a thermally activatable catalyst there is still a tendency for some crosslinking to occur at ambient temperature; thus having an adverse effect on the shelf-life of the decoration material and therefore on the length of time the decoration materials can be stored prior to use. German Offenlegungsschrift No. 26 45 640 describes the use as thermally activated catalyst of amine or ammonium salts of strong acids and in particular of amine salts of p-toluene sulphonic acid. The activity of the amine or ammonium salts depends upon the dissociation of the salt and therefore greater stability of the decoration material is obtained.

The mode of action of the above kind of blocked catalysts depends upon the ability of the base component to take up the proton produced by the ionisation of the acid component thus producing a neutral salt which may be represented as $BH^+A^-$ in which B and A are the base and acid components respectively. The neutral salt exists, in fact, as a component in a dissociation equilibrium, $$BH^+A^- \rightleftharpoons B + H^+ + A^-$$

By incorporating an excess of the base component in the blocked catalyst the equilibrium is pushed away from the acid by the operation of the Law of Mass Action. On heating to an appropriate temperature ionisation of the salt is promoted leading to an acid reaction and initiation of the acid catalysed reaction. If additionally the base is volatile so that raising the temperature also accelerates the rate of loss of base by the system then the acid reaction is further enhanced. Although the acid and base strengths of the components of the neutral salt are important factors in determining the readiness of the dissociation they are not the only ones to be considered in the preparation of a blocked catalyst system. It is possible to render dissociation of the salt more difficult by combining a weak base with a strong acid but this is of little value since the salt itself is acid in such cases and the blocking effect is inadequate. Alternatively, a strong base may be employed with a weak acid to produce a more weakly dissociating salt but in this case the acidity generated on heating is inadequate for the required catalysis. Another factor of major importance is the extent to which the salt is stabilised by the operation of general intermolecular forces between the base and the acid. General forces of attraction between the acid and base components lead to stabilisation of the salt. The development of such forces depends upon the structures of the acid and the base. In general bases of low molecular weight will be subject to such forces less than those of higher molecular weight and higher polarisability. Consequently the ionisation of the ammonium salts of strong acids is not significantly less than that of the monoethanolamine or diethylamine salts of the same acids despite the fact that it is a weaker base. This fact combined with the great volatility of ammonia generally renders it an unsuitable base for use in blocked catalyst systems particularly where the system in which stability is required has an extensive surface area such as is presented by a printed decoration layer or the system is to be stored for considerable periods of time i.e. weeks or months. Even if a higher molecular weight base is used in the blocked catalyst to minimise dissociation, the practical limits imposed by the requirement that eventually the system has to be cured on heating means that the base must be fairly readily removed by evaporation. Although excess base may be employed it is only a matter of time before the excess is lost particularly when the stabilised system has a high surface area and the point of neutralisation is reached. This situation is highly critical when the salt of a strong acid is involved since the loss of even a very small proportion of the base leads to a very marked increase in acidity. Thus a slow partial curing occurs at storage temperatures due to the innate instability of blocked catalyst systems of this kind.

We have now found that these difficulties can be overcome if instead of using an excess of amine to promote the stability of the blocking effect, the amine salt of a weak acid group of little or no catalytic effectiveness is employed. A blocked catalyst system based on the mixture of an amine salt of a strong acid group with an amine salt of a weak acid group has been found to give higher stability to storage and processing factors such as drying than one in which the simple amine salt of the strong acid is used or the said amine salt is used with an excess of amine. In the mixed acid system the strong and weak acid groups may be separate entities, i.e. in different acids, or they may be different acid groups of a polybasic acid. The number of acids employed in the blocked system can be one, two, three or more. A catalytically effective or strong acid group is, in the present context, one which in aqueous solution at 20° C. exhibits a pKa of 3.50 or less. The weak acid groups of little or no catalytic effectiveness for practical applications have pKa's of 3.75 or more. Typical strong acids include p-toluene sulphonic acid, benzene sulphonic acid, nitric acid, and hydrochloric acid which all have pKa values of less than 2.6. Typical weak acids include lactic acid, propionic acid, benzoic acid, trimethylacetic acid, and β-(p-tolyl)-propionic acid whose pKa values are 3.86, 4.87, 4.21, 5.03 and 4.68 respectively and stearic acid whose pKa is of the order of 5. In addition there may be used polybasic acids in which both acid groups are weak e.g. adipic acid ($pKa_1$ 4.43, $pKa_2$ 5.41) and octanedioic acid ($pKa_1$ 4.52, $pKa_2$ 5.40) respectively. Polybasic acids which combine both strong and weak acid functions include,

| | $pKa_1$ | $pKa_2$ | $pKa_3$ |
|---|---|---|---|
| Citric acid | 3.14 | 4.77 | 6.39 |
| Oxalic acid | 1.25 | 4.23 | |
| Malonic acid | 2.80 | 5.67 | |
| Maleic acid | 2.00 | 6.25 | |
| Tartaric acid | 3.04 | 4.37 | |
| Phthalic acid | 2.94 | 5.40 | |
| Benzene tricarboxylic acid | 2.12 | 3.89 | 4.70 |

Where possible the pKa values quoted above are taken from I.U.P.A.C. Tables "Dissociation Constants of Organic Acids in Aqueous Solution" Butterworths (1961). The values relate to data obtained at 20° C.

Suitable blocking bases fall into the general class of organic amines with a pKa of greater than 9.4 and a molecular weight of more than 60 for example monoethanolamine, diethanolamine, triethanolamine, and hexamethylene diamine.

According to the present invention there is provided a decoration material comprising a flexible substrate having thereon a transferable layer which under the influence of heat and pressure is capable of being transferred from the substrate to the material to be decorated and which comprises a dye or pigment, a film-forming polymer, a crosslinking agent capable on curing of rendering the film-forming polymer insoluble and a thermally activatable catalyst for promoting the crosslinking reaction, the catalyst comprising (a) the salt of one or more (strong) acid groups having a pKa in aqueous solution at 20° C. of at most 3.50 with an organic base which is volatile or unstable at the temperature of the crosslinking reaction, has a pKa greater than 9.4, and a molecular weight greater than 60, and (b) the salt of one or more (weak) acid groups having a pKa in aqueous solution at 20° C. of 3.75 or more with an organic base as defined under (a).

To decorate the textile fabric, the transferable layer of the decoration material according to the invention is pressed on to the textile fabric while heating. The procedures may involve pressing at a lower temperature followed by removal of the flexible substrate to leave the layer adhering to the textile fabric followed by heating the textile fabric at a higher temperature to fix the decoration. Alternatively pressing may be carried out at a higher temperature to effect transfer and curing without intermediate removal of the flexible substrate.

For a commercially attractive process the cross-linking reaction should occur in a reasonably short time (about 2–3 minutes or less) at a temperature not exceeding 220° C. and result in sufficient crosslinking of the transferred material to give good washing fastness. The properties of crosslinking agents which react by acid catalysis and which enable a commercially viable process to be operated are such that the preference for catalytically effective acids on which a suitable catalyst may be based falls into the strong acid category given above.

In the catalyst salt or salts the acid groups may be partially or totally salified; that is the amount of base used is sufficient to react with the strong acid groups present and to provide an excess which reacts at least partially with any acid or acid group present with a pKa of 3.75 or more.

The degree of salification preferred depends upon (a) the degree of dissociation of the amine salt of the weak acid and (b) the degree of stabilisation required in the system. If a very high degree of stabilisation is achieved by the use of a strong acid/amine salt in which the pKa of the acid group is the maximum value appropriate to its use as a catalyst and stabilisation is enhanced by the use of the amine salt of a very weak acid, the curing conditions needed after transfer to achieve crosslinking may be excessively severe. More ready curing could be obtained if a lesser but still satisfactory degree of stabilisation was achieved by the use of a stronger "strong" acid, a stronger "weak" acid, or a partially salified "weak" acid of the same pKa. The degree of stabilisation needed will depend upon end use, storage conditions and required storage life. Printed materials required to be stored for long periods under tropical conditions will require greater stabilisation than those which will be used quickly and stored in a cold climate.

It is unnecessary to prepare the amine salts prior to formulation of the transferable layer. Rather an appropriate amount of amine may be premixed with the other ingredients of the formulation and the required acid added later so that the salts are formed in situ.

The flexible substrate of the decoration material according to the invention should be one which, while permitting sufficient adhesion of the decorating transferable layer for practical handling purposes, does release the layer readily. This may be achieved by having a hydrophilic/hydrophobic contrast between the surface of the flexible support and the removable layer. The contrast may be achieved by selection of a flexible support with a naturally hydrophilic or hydrophobic surface, for example, a plastics film or metal foil, or it may consist of a flexible material such as paper having an appropriate coating thereon, for example, a silicone or synthetic polybutadiene rubber. Such coated surfaces should be non-porous to the transferable layer when it is applied and may be produced by coating or printing. An alternative method of producing a flexible substrate with good releasing properties is to coat or print a suitable material such as paper with a solution of a thermoplastic polymer which is incompatible in solution with the film-forming polymer used to produce the thin transferable layer. The two layers do not show mixing at their interface thus assisting easy release in the transfer process. Thus a paper may be coated with a layer of an ethyl acrylate/methyl methacrylate copolymer which is incompatible in solution with a release layer consisting substantially of polyvinyl butyral. As examples of suitable materials for flexible substrates for use in the process of the invention may be quoted cellulose acetate and polypropylene films, metal foils, e.g. aluminum foil, paper coated with silicones, polypropylene, acrylic copolymers, paraffin wax, polybutadiene, clay/latex emulsions and polyamides. In addition the release coating may have incorporated therein a plasticiser or other component which aids printing and/or release properties e.g. zinc/calcium resinate. The release coatings may also be based on Werner chromium complexes. There may be used condensation products of dimerised linoleic acid with ethylene diamine as thermoplastic film-forming release coating. Suitably the flexible substrate is of paper having a polyamide/2-oxazoline ester based wax as release coating.

The transferable layer and releasing system of the present invention is preferably as described in U.K. Patent Specifications Nos. 1,496,891 and 1,496,892, more preferably as described in German Offenlegungsschrift No. 26 45 640; though of course the transferable layer must contain in addition to the polymeric material a crosslinking agent and catalyst salts as defined above. In addition the transferable layer and releasing system may be of the kind described in German Offenlegungsschrift No. 27 32 576 containing a polymer, a crosslinking agent and catalyst salts as defined above.

The film-forming polymeric material for use in the transferable layer may be selected from a wide variety of materials. The polyvinyl acetals are preferred e.g. polyvinylbutyrals. Polyvinylidene chloride may also be used. Polyvinylbutyral and polyvinylidene chloride have the advantage of being thermoplastics which give elastomeric transferable films. This confers the property of thermal instability on the films when they are heated under conditions where they are no longer stabilised by the flexible substrate. Polyvinylbutyral and polyvinylidene chloride may be mixed with other compatible thermoplastic materials which do not in themselves have the property of giving elastomeric films. The advantageous properties of polyvinylbutyral and polyvinylidene chloride are not impaired if the amount of the second polymer does not exceed 25% of the total amount of thermoplastic polymer present. Such additional polymers include acrylic polymers, polyamides, linear polyethers, amino resins such as are obtained by the reaction of ethylene diamine with low molecular weight epoxy resin, isobutylated melamine formaldehyde polymer. Alternatively, the film-forming material can be a non-elastomeric thermoplastic material alone although the transferred decorative film tends in such cases to give a continuous rather than a discontinuous decorative film on the textile. The transferable layer may contain a high temperature plasticiser e.g. stearol-ethylene oxide condensate.

Crosslinking agents which may be employed include glyoxal, methylol amides and their esters such as methylol urea, trimethylol melamine, hexamethoxymethyl melamine, methylol triazones, methylol cyclic ethylene urea, methylol cyclic propylene urea, dimethylol derivatives of hexahydropyrimidone derivatives of the general formula

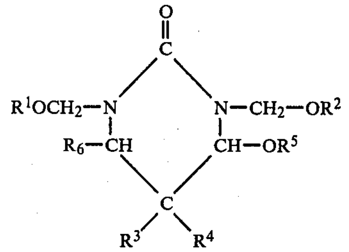

in which $R^1$, $R^2$ and $R^5$ denote hydrogen atoms, alkyl radicals having up to eight carbon atoms, hydroxyalkyl radicals having up to eight carbon atoms whose hydroxyl group is separated from the oxygen atom by at least two carbon atoms, alkoxyalkyl radicals having up to eight carbon atoms in the alkyl portion and up to four carbon atoms in the alkoxy portion, whose alkoxy groups are separated from the oxygen atom by at least two carbon atoms, or allyl radicals, and $R^3$, $R^4$ and $R^6$ denote hydrogen atoms or alkyl radicals having one to five carbon atoms.

The catalyst salt may be incorporated in any sublayer of the transferable layer of the decorating material which may be made up of one or a multiplicity of layers between which the necessary components are distributed. The catalysts may be in the same layer as the crosslinking agent or in a different layer as described in German Offenlegungsschrift No. 26 45 640. Further if the flexible substrate is coated to give it release properties the catalyst salts and/or the crosslinking agent may be incorporated in the release coating in appropriate cases where the release coating is partially transferring or is such that one or more components transfer from it under the transfer conditions.

A further feature of the catalyst salts according to the present invention is that they may give a transferable layer even when it is printed on a flexible substrate with an acid reaction e.g. acid-sized bleached Kraft paper or silicone-coated paper. As emphasised in U.K. Patent Specifications Nos. 1,496,891 and 1,496,892 and German Offenlegungsschrift No. 26 45 640 previously problems sometimes arose from the residual acid reaction of the flexible substrate and some ink additives. The catalyst salts according to the present invention offer the advantage that the need for such precautions is greatly lessened giving a more robust product produced with greater ease. In the formation of the decoration materials the coated or printed support generally requires to be dried and when the decoration or transferable layer is built up by successive printing operations then at least one of the layers may be subjected to the drying operation several times. With the catalyst salts it is found that the transferable film is less liable to show premature curing during such multiple drying operations and less likely to suffer a loss in stability as a result of them.

Transfer conditions most conveniently involve bringing the decoration material into contact with the textile fabric so that the decorated surface and the textile are in contact and heating by passing the composite through heated callender rollers, pressing between heated plates as in a garment press, hand ironing or holding in contact against a heated drum by means of a stretched blanket. The heating contact may be very short or prolonged according to the mode of operation. The flexible substrate may be removed after the heat treatment and the decorated textile further heated to fully cure the transferred film or the curing may be completed before the flexible support is removed. Generally transfer temperatures vary between 90° C. and 200° C. according to circumstances.

The stability to storage of decoration materials is readily tested. Instability is shown by premature curing of the transferable layer on the flexible substrate which renders the layer insoluble in a suitable solvent such as that employed to prepare the ink for the decorating material. Thus an "unstable paper" shows itself as having an applied layer which does not readily dissolve when a sample of the stored paper is immersed in the solvent. Storage tests are readily carried out in an oven with ready access of air to store material. It has been found that storage at 50° C. gives a good indication of relative stability. Stability to the storage test for 17 hours is found to be equivalent to approximately 30 days stability under average U.K. ambient conditions. Satisfactory stability for commercial operations is regarded as being of 6 months duration at an average temperature of 30° C. This would allow the paper to be stored for an adequate period in most climates or to be transported from one region to another. Such a stability level is equivalent to 8–10 days storage stability at 50° C.

A sample of decoration material produced using polyvinyl butyral with trimethylolmelamine as the crosslinking agent and a mixture of p-toluene sulphonic acid with monoethanolamine in 5% excess of the amount required to form the salt when stored at 50° C. showed complete insolubility in alcohol after 12 hours. If, instead of trimethylol melamine, 1,3-dimethylol-4-methoxy-5-dimethylhexahydropyrimidone-2 is used as crosslinking agent, the solubility of the sample is lost after 17 hours storage at 50° C. If instead of the p-toluene sulphonic acid-monoethanol amine mixture, zinc nitrate is used as the acid-generating catalyst the alcohol solubility is lost rather more rapidly than in either of the previous cases. Using catalyst salts according to the present invention storage stability times at 50° C. may be greatly increased so that commercially satisfactory storage stability can be achieved.

The invention also provides a printing ink for use in the manufacture of decorating materials comprising an ink vehicle of a film-forming polymer, a crosslinking agent capable on curing of rendering the film-forming polymer insoluble, a dye or pigment and a thermally activatable catalyst for promoting the crosslinking reaction, the catalyst comprising salts (a) and (b) as defined above.

The invention is further illustrated in the following Examples:

EXAMPLE 1

An acid-sized bleached Kraft paper is coated with a composition containing in each 100 parts

- 40 parts of a condensation product of dimerised linoleic acid with ethylene diamine
- 1 part of a substituted 2-oxazoline ester wax
- 59 parts of 64 OP ethanol to a wet thickness of 36 microns. The coated paper is then dried at 75° C. for 60 seconds.

The dried coated paper is then screen printed with an ink containing in each 100 parts

- 6 parts of C.I. Pigment Red 1
- 1 part of a salt formed from a 3:2 mixture by weight of citric acid and monoethanolamine
- 2 parts of hexamethoxymethylmelamine
- 10 parts of stearol-ethylene oxide condensate
- 15 parts of polyvinyl butyral
- 66 parts of diacetone alcohol.

The printed paper is dried at 100° C. for 1 minute. A sample of the paper is stored in an oven at 50° C. for 18 days. Comparison of a sample of freshly dried paper and the stored sample on immersion in 64 OP ethanol at room temperature demonstrates that the solubility of the dried ink film is unimpaired by storage. If the remainder of the coated paper is contacted with a cotton fabric and pressed with a hand iron operating at a surface temperature of 175° C. for 60–90 seconds and the bleached Kraft support paper removed, the cotton is decorated with a fast red design resistant to washing and rubbing which is of good appearance. The decorated fabric exhibits no undesirable stiffness and is permeable to air.

EXAMPLE 2

A neutral-sized bleached Kraft paper is coated with a composition containing in each 100 parts

- 40 parts of a condensation product of dimerised linoleic acid with ethylene diamine
- 5 parts of hexamethoxymethylmelamine
- 5 parts of a substituted 2-oxazoline ester wax 50 parts of isopropyl alcohol to a wet thickness of 30 microns. The coated paper is then dried at 70° C. for 60 seconds. It is then printed by screen printing with an ink containing in each 100 parts

- 6 parts of carbon black pigment
- 1 part of a salt formed from a 2:1 mixture by weight of citric acid and monoethanolamine
- 10 parts of a stearol-ethylene oxide condensate
- 15 parts of polyvinyl butyral
- 46 parts of diacetone alcohol
- 22 parts of polyethylene glycol 100.

The printed paper is dried at 80° C. for 50 seconds. A storage test carried out as in Example 1 shows that the printed paper retains its stability for at least 17 days at 50° C. If the paper is contacted with a knitted cotton T-shirt and the composite held in a platen press operating at an effective pressure of 2–3 lbs per square inch at 195° C. for 60 seconds, then on removal from the press and removal of the backing paper, the garment is found to be decorated with a fast black design without impairment of the handle of the garment. The fastness is excellent and the decorated part of the garment may be ironed directly without the development of tackiness or marking.

EXAMPLE 3

A paper coated with an aqueous solution of a water-soluble Werner chromium complex and polyvinyl alcohol followed by drying is printed by gravure printing with an ink containing in each 100 parts

- 15 parts of polyvinylbutyral
- 6 parts of C.I. Pigment Orange 6
- 3 parts of dimethylol-5-methoxy-pyrimidone-2
- 1 part of a salt formed from a 1:1 mixture by weight of tartaric acid and monoethanolamine 5 parts of an ester amide wax
70 parts of isopropanol.

After applications of the ink the printed paper is dried at 80° C. for 30 seconds. The dried paper is contacted with a mercerised cotton poplin fabric and passed between heated rollers operating at a speed of 15 yards per minute, a temperature of 125° C. and a pressure of 70 lbs per linear inch of nip. Immediately after leaving the nip the paper is peeled from the fabric leaving the design on the cloth. The cloth is then passed through a hot flue at 165° C. for 60 seconds. It is thus decorated with a fast orange shade. The paper before transfer is stable to storage when tested as in Example 1 for over 2 weeks.

EXAMPLE 4

A neutral-sized bleached Kraft paper is printed overall by a gravure roller with a solution containing 30 parts of an isobutyl methacrylate copolymer, 10 parts of p-toluene sulphonamide and 60 parts of toluene in each 100 parts. The dried printed paper is then printed by gravure printing with a design using an ink containing in each 100 parts.

6 parts of C.I. Pigment Red 9
12 parts of polyvinylbutyral
5 parts of dimethylol cyclic ethylene urea
2 parts of a salt formed from a 3:4 mixture by weight of maleic acid and diethanolamine
10 parts of tricresyl phosphate
65 parts of isopropanol.

The printed paper is dried at 85° C. for 30 seconds. Its stability to the storage test described in Example 1 is very good and if transferred to a cotton/polynosic rayon blended fabric using a heated callendar operating at 80 lbs per linear inch of nip, a temperature of 130° C. and a running speed of 10 yards per minute followed by curing for 60 seconds at 180° C., a fast red decoration is obtained.

EXAMPLE 5

If in Example 3, the C.I. Pigment Orange 6 is replaced by C.I. Pigment Green 13, and the design is transferred to a woven silk fabric, an attractive fabric decoration is obtained which is fast to washing and light.

EXAMPLE 6

An ink containing in each 100 parts
13 parts of polyvinylidene chloride
1.1 parts of ethylacrylate polymer
13.2 parts of stearol-ethylene oxide condensate
1 part of a salt formed from a 1.2:1 mixture by weight of malonic acid and hexamethylene diamine
3 parts of hexamethoxymethylmelamine
6 parts of C.I. Pigment Yellow 31
62.7 parts of tetrahydrofuran is printed by gravure printing onto a release paper coated with a Werner chromium complex with myristic acid. The printed paper is brought into contact with a woven cotton fabric and passed between hot rollers at a speed of 15 yards per minute with the rollers operating at a pressure of 90 lbs per linear inch of nip and a temperature of 120° C. The paper is then removed and the decorated fabric heated in a hot flue at 170° C. for 1 minute. The fabric is then decorated with a lemon yellow design which is fast to washing.

EXAMPLE 7

A silicone coated paper is printed by screen printing using an ink containing in each 100 parts 30 parts of isobutylmethacrylate thermoplastic copolymer
5 parts of trimethoxymethyl melamine
6 parts of carbon black pigment
5 parts of tricresyl phosphate
3 parts of a salt formed from a 1:1 mixture by weight of citric acid and diethanolamine
51 parts of white spirit and dried at 85° C. over 2 minutes. The dried paper is contacted with a knitted polynosic rayon fabric and the composite passed between hot rollers at a speed of 12 yards per minute at a temperature of 100° C. The rollers are operated at a pressure of 50 lbs per linear inch of nip. While the paper is still adhering to the fabric, the composite is passed through a hot flue at 170° C. for 1½ minutes. The paper is then removed to leave a fast black design on the fabric.

The decorating material when stored in an oven at 50° C. is found to be unchanged after several days. Premature curing is checked by using the method of Example 1 but replacing the ethanol used by white spirit.

EXAMPLE 8

A paper coated with an aqueous solution of a Werner chromium complex with myristic acid and polyvinyl alcohol followed by drying is printed using a gravure roller with an ink containing in each 100 parts 6 parts of C.I. Pigment Red 1
40 parts of a condensation product of dimerised linoleic acid with ethylene diamine
5 parts of hexamethoxymethyl melamine
2 parts of a salt formed from a 2:1 mixture by weight of citric acid and monoethanolamine
5 parts of a stearol-ethylene oxide condensate
42 parts of a 4:1 mixture of isopropanol and toluene and dried at 80° C. over 20 seconds. The dried paper is pressed against a woven fabric made up from a blend of equal parts of polyester and cotton fibres and the composite passed between heated rollers at a speed of 12 yards per minute, an operating temperature of 125° C. and a pressure of 90 lbs per linear inch of the nip. Immediately after leaving the nip the paper is peeled from the fabric leaving the printed design. The decorated cloth is then heated for 50 seconds in a hot flue at 170° C. and is thus decorated to a fast red design.

The decorating material when stored in an oven at 50° C. is found to be unchanged after several days.- Premature crosslinking is detected by the development of insolubility in 4:1 isopropanol/toluene mixture.

EXAMPLE 9

A silicone coated paper is printed by rotary screen printing with an ink containing in each 100 parts 4 parts of C.I. Pigment Red 1
1 part of copper phthalocyanine
1 part of C.I. Disperse Red II
15 parts of polyvinyl butyral
10 parts of stearol-ethylene oxide condensate
3 parts of dimethylol-5-methoxy pyrimidone-2
1 part of p-toluene sulphonic acid-monoethanolamine salt
1 part of lactic acid—monoethanolamine salt
64 parts of isopropanol.

After application of the ink the printed paper is dried at 70° C. for 60 seconds. The paper is then contacted with a woven fabric made up from 2:1 blend of polyester and polynosic rayon fibres, passed between rollers heated to 110° C. running at a speed of 12 yards per minute and a pressure of 60 lbs per linear inch of nip. It is then peeled from the fabric and the latter is passed through a hot flue operating at 210° C. over a period of 45 seconds. The material is decorated to a bluish red shade fast to washing and light.

If the decorating material is stored in an oven at 50° C. for two days it is found that the printed design retains its solubility in 64 O.P. ethanol. If the experiment is repeated with the omission of the lactic acid-monoethanolamine salt it is found that the alcohol solubility is lost within 16–17 hours.

EXAMPLE 10

A sized bleached Kraft paper is coated with a solution containing in each 100 parts 30 parts of a condensation product of dimerised linoleic acid with ethylene diamine
4 parts of zinc/calcium resinate
66 parts of isopropanol to a wet thickness of 20 microns. The coated paper is dried at 75° C. for 60 seconds. It is then gravure printed with an ink containing in each 100 parts 12 parts of C.I. Pigment Orange 6
3.5 parts of ethyl cellulose
2.5 parts of ethylene glycol
82 parts of toluene.

The printed paper is then coated to a wet film thickness of 24 microns with a solution containing 15 parts of polyvinyl butyral
10 parts of stearol-ethylene oxide condensate
1 part of p-toluene sulphonic acid-monoethanolamine salt
2 parts of triethanolamine stearate
8 parts of hexamethoxymethyl melamine
69 parts of isopropanol and dried for 1 minute at 80° C.

The printed and coated decoration material thus obtained is brought into contact with a woven cotton fabric and the composite passed between heated rollers at an operating temperature of 135° C., a pressure of 85 lbs per linear inch of the nip and a running speed of 15 meters per minute. The paper is peeled from the cloth immediately on leaving the nip and the cloth passed down a hot flue at 175° C. for 45 seconds. The cloth is found to be decorated with a fast orange design.

If the decoration material is subjected to an accelerated storage test as described in Example 9 it is found to have excellent stability.

EXAMPLE 11

A bleached Kraft paper which has been coated with an aqueous solution of a water-soluble Werner chromium complex and polyvinyl alcohol and then dried is printed by flexography with an ink containing 12 parts of carbon black
4 parts of monoethanolamine
44 parts of an acrylic copolymer emulsion
40 parts of water.

The paper is then coated to a wet film thickness of 30 microns with a solution containing 16 parts of polyvinyl butyral
1 part of a salt formed from a 3:1 mixture by weight of citric acid and triethanolamine
10 parts of stearol-ethylene oxide condensate
3 parts of hexamethoxy methyl melamine
70 parts of 80% ethanol and dried at 80° C. for 60 seconds. The paper is used to decorate a cotton fabric as described in Example 10. The cotton then carries a black decoration.

The paper is stable to accelerated storage conditions as described in Example 9.

EXAMPLE 12

A bleached Kraft paper is coated to a thickness of 36 microns with a solution contaning 40 parts of a condensation product of dimerised linoleic acid with ethylene diamine
3 parts of zinc/calcium resinate
20 parts of polyethylene wax
37 parts of 60/40 isopropanol/toluene and dried at 80° C. for 60 seconds.

The coated paper is then printed using lithography in combination with a non-drying lithographic ink containing 20% copper phthalocyanine. The printed paper is then coated to a wet film thickness of 36 microns with a solution containing.

15 parts of polyvinyl butyral
2 parts of a salt formed from a 3:1 mixture by weight of triethanolamine and oxalic acid
5 parts of a substituted 2-oxazoline ester wax
3 parts of hexamethoxymethyl melamine
75 parts of isopropanol and dried at 85° C. for 50 seconds.

The paper is then contacted with a woven cotton material in the manner described in Example 2 to produce a fast blue decoration.

We claim:

1. A decoration material comprising a flexible support having thereon a transferable layer which under the influence of heat and pressure is capable of being transferred from the support to the material to be decorated and which comprises a dye or pigment, a film-forming polymer, a crosslinking agent capable on curing of rendering the film-forming polymer insoluble and a thermally activatable catalyst for promoting the crosslinking reaction, the catalyst comprising (a) the salt of one or more acid groups having a pKa in aqueous solution at 20° C. of at most 3.50 with an organic amine which is volatile or unstable at the temperature of the crosslinking reaction, has a pKa greater than 9.4, and a molecular weight greater than 60, and (b) the salt of one or more acid groups having a pKa in aqueous solution at 20° C. of 3.75 or more with an organic amine as defined under (a).

2. A decoration material according to claim 1 wherein, in the catalyst, all the acid groups defined under (a) are salified and the acid groups defined under (b) are partially salified.

3. A decorated material according to claim 2 wherein the catalyst is a monoethanolamine, diethanolamine, triethanolamine or hexamethylene diamine salt of citric acid, oxalic acid, malonic acid, maleic acid, tartaric acid, phthalic acid or benzene tricarboxylic acid.

4. A decoration material according to claim 1 wherein the catalyst comprises a mixture of monoethanolamine salt of p-toluene sulphonic acid and triethanolamine stearate.

5. A decoration material according to claim 1 wherein the flexible support is of paper, optionally provided with a release coating.

6. A decoration material according to claim 5 wherein the flexible support is of paper having a polyamide/2-oxazoline ester based wax as release coating.

7. A decoration material according to claim 1 wherein the film-forming polymer is polyvinyl butyral or polyvinylidene chloride.

8. A method of decorating a substrate which comprises applying a decoration material as claimed in claim 1 to the substrate under the action of heat and pressure, subjecting the transferable layer of such decoration material on the substrate to heat treatment to fix the decoration on the substrate and removing the flexible support.

9. A method of decorating a substrate according to claim 8 wherein the substrate is a textile material.

10. A decoration material according to claim 1 wherein the acid groups defined under (a) and (b) are in different acids.

* * * * *